US007360418B2

(12) United States Patent
Pelovitz

(10) Patent No.: US 7,360,418 B2
(45) Date of Patent: Apr. 22, 2008

(54) METHOD AND APPARATUS FOR SENSING LIQUID LEVEL USING BASELINE CHARACTERISTIC

(75) Inventor: Robert Pelovitz, Nashua, NH (US)

(73) Assignee: Keurig, Incorporated, Reading, MA (US)

( * ) Notice: Subject to any disclaimer, the term of this patent is extended or adjusted under 35 U.S.C. 154(b) by 97 days.

(21) Appl. No.: 11/168,884

(22) Filed: Jun. 28, 2005

(65) Prior Publication Data

US 2006/0288776 A1  Dec. 28, 2006

(51) Int. Cl.
*G01F 23/26* (2006.01)
(52) U.S. Cl. .................. 73/304 C; 73/304 R
(58) Field of Classification Search .............. 73/304 R, 73/304 C
See application file for complete search history.

(56) References Cited

U.S. PATENT DOCUMENTS

| | | | |
|---|---|---|---|
| 3,596,588 A | 8/1971 | Moss | |
| 4,163,391 A | 8/1979 | Bezard et al. | |
| 4,213,339 A | 7/1980 | Shannon | |
| 4,382,382 A | 5/1983 | Wang | |
| 4,451,894 A | 5/1984 | Dougherty et al. | |
| 4,461,175 A | 7/1984 | Baumgart et al. | |
| 4,466,282 A | 8/1984 | Kuhnel | |
| 4,619,140 A | 10/1986 | Kuhnel | |
| 4,626,874 A | 12/1986 | Murai et al. | |
| 4,646,569 A | 3/1987 | Cosser | |
| 4,716,536 A * | 12/1987 | Blanchard ................... | 702/100 |
| 4,728,005 A | 3/1988 | Jacobs et al. | |
| 5,033,300 A | 7/1991 | Matsuo et al. | |
| 5,195,422 A | 3/1993 | Newnan | |
| 5,202,667 A | 4/1993 | Alvin | |
| 5,220,514 A | 6/1993 | John | |
| 5,233,329 A | 8/1993 | Lippmann et al. | |
| 5,272,919 A | 12/1993 | Herm | |
| 5,287,086 A | 2/1994 | Gibb | |
| 5,321,633 A | 6/1994 | Kataoka et al. | |
| 5,553,494 A | 9/1996 | Richards | |

(Continued)

FOREIGN PATENT DOCUMENTS

EP  1 020 735 A2  7/2000

(Continued)

OTHER PUBLICATIONS

International Search Report and Written Opinion mailed Dec. 5, 2006 for International Application No. PCT/US2006/024737.

*Primary Examiner*—Hezron Williams
*Assistant Examiner*—Paul M West
(74) *Attorney, Agent, or Firm*—Wolf, Greenfield & Sacks, P.C.

(57) ABSTRACT

A liquid level sensing arrangement using a probe uses a baseline probe circuit characteristic, e.g., a circuit resistance or voltage, that is measured when the probe is out of contact with the liquid in the tank. The baseline characteristic may be used to determine a liquid level in the tank, e.g., a determination whether the liquid level is below or at/above the probe. In one embodiment, the baseline characteristic may be compared to a circuit characteristic that is measured as the tank is being filled. A difference between the baseline characteristic and the other circuit characteristic may be used to determine whether or not the probe is in contact with the liquid.

28 Claims, 2 Drawing Sheets

U.S. PATENT DOCUMENTS

| | | |
|---|---|---|
| 5,727,421 A | 3/1998 | Murphy |
| 5,775,164 A | 7/1998 | Kishi |
| 6,082,419 A | 7/2000 | Skell et al. |
| 6,138,508 A * | 10/2000 | Hannan et al. ........... 73/304 C |
| 6,223,595 B1 | 5/2001 | Dumbovic et al. |
| 6,546,944 B1 | 4/2003 | Renau |
| 6,644,343 B2 | 11/2003 | Bethuy et al. |
| 6,650,128 B2 | 11/2003 | Sanders |
| 6,748,804 B1 | 6/2004 | Lisec et al. |
| 6,766,728 B2 | 7/2004 | Fogagnolo et al. |

FOREIGN PATENT DOCUMENTS

| | | |
|---|---|---|
| GB | 2 350 004 | 11/2000 |

* cited by examiner

METHOD AND APPARATUS FOR SENSING LIQUID LEVEL USING BASELINE CHARACTERISTIC

BACKGROUND OF INVENTION

1. Field of Invention

This invention relates to methods and apparatus for liquid level sensing.

2. Related Art

Level sensing in a tank, such as a tank for storing, heating and/or metering water in a coffee brewing machine, may be important for several reasons, such as for advising a user that the tank needs to be refilled, for determining a volume present in the tank, and/or preventing operation of the machine without sufficient water being present in the tank. Level sensing in such applications may be done in different ways. In one approach, a conductive probe may be used to detect the presence of the water in the tank by determining whether the resistance of a circuit including the probe drops below an absolute threshold, e.g., below 3000 ohms indicating the presence of relatively low resistance water in the circuit.

SUMMARY OF INVENTION

The inventors have appreciated that the use of some prior probe detection arrangements may not work as desired in some conditions. For example, in some applications with highly filtered water, such as reverse osmosis deionized (RODI) filtered water, it may be difficult to detect the water level because of the relatively high resistance of the filtered water. For example, some detection arrangements measure the resistance of a normally open circuit between a conductive probe and the tank wall, which circuit typically has a relatively high resistance when air is present between the probe and the tank. When highly conductive water is used, the resistance of the circuit drops substantially when water is present in the circuit between the probe and the tank. However, with some types of highly filtered water, the resistance of the water may be relatively high, preventing some systems from detecting the presence of the water between the probe and the tank.

Another problem encountered with some systems is scale or other deposits that may be present on the probe, tank walls and/or other portions of the sensing circuit. Such deposits may be relatively common in systems where water is heated in the tank, e.g., for brewing purposes. Scale and other deposits may cause the probe circuit resistance to vary over time, e.g., over the course of 100 or more tank fill/heat/ dispense cycles, as well as cause the probe circuit resistance to vary over the course of a single fill operation. For example, when a tank is new or relatively free of deposits, the resistance of the probe circuit may be relatively high with no water present at the probe. Over the course of many tank fill/heat/dispense cycles, scale buildup in the tank may cause the resistance of the probe circuit to drop from what it was when the tank was new. Also, when a tank is new, the resistance of the probe circuit generally will not change much when the tank walls are hot and the tank is refilling. However, when scale is present on the tank walls and/or the probe, the scale may contain a certain amount of water immediately after the tank is drained. If the tank walls are hot, the water held by the scale may tend to evaporate, e.g., as the tank is being filled, causing the resistance of the probe circuit to increase. As a result, the performance of the level sensing arrangement may change in relatively unpredictable ways over the life of the system and cause certain systems to be unable to reliably detect the water level in a tank.

In one aspect of the invention, a method for determining a level of a liquid in a tank includes providing a tank in which a liquid level is variable, and measuring a baseline characteristic of a probe circuit including a probe associated with the tank while the probe is out of contact with the liquid in the tank. The baseline characteristic may be a voltage, resistance or other characteristic of a circuit including the probe. The baseline characteristic may be measured when the probe is known to be out of contact with liquid in the tank, such as soon after the tank has been drained below the probe level. A first characteristic of the probe circuit may be measured after measuring the baseline characteristic, e.g., while the tank is being filled. Based on the baseline characteristic, the liquid level in the tank may be determined for a time corresponding to about when the first characteristic is measured. For example, the first characteristic may be compared to the baseline characteristic, and based on the comparison it may be determined whether the liquid level is below the probe, or at or above the probe. In one embodiment, a difference between the first characteristic and the baseline characteristic may be determined, and if the difference exceeds a threshold, it may be determined that the liquid is at or above the probe level.

By using a measured baseline characteristic, the liquid level determining approach may be capable of more reliably detecting the presence of the liquid at the probe, even when highly filtered water is used and/or scale or other deposits are present at the tank, probe or other portions of the probe circuit. Measuring the baseline characteristic (e.g., during the tank fill operation) can enable the system to determine the resistance or other characteristic of the probe circuit in a known condition (when the probe is out of contact with the liquid), and use that characteristic to compare to later measured characteristics. Thus, if scale or other deposits are present that alter the resistance or other characteristic of the probe circuit, measuring the baseline characteristic can effectively take the changes to the circuit caused by the scale or other deposits into account when determining the liquid level. Also, since the baseline characteristic can be accurately measured, relatively small changes in resistance that may occur when using highly filtered water or other high resistance liquid may be detected.

In another aspect of the invention, a liquid level determining system may include a probe circuit including a conductive probe constructed and arranged to contact a liquid in a tank in which the liquid level is variable. A controller may be adapted to measure a baseline characteristic of the probe circuit while the conductive probe is out of contact with the liquid in the tank, measure a first characteristic of the probe circuit after measuring the baseline characteristic, and determine the liquid level in the tank for a time that corresponds to about when the first characteristic is measured.

In one embodiment, the controller may measure the baseline characteristic repeatedly during a tank fill operation so that the baseline characteristic can be updated during the fill. For example, a baseline characteristic may be compared to the first characteristic and if a determination is made that the liquid is not at or above the probe, the value of the first characteristic may be assigned as the baseline characteristic used when subsequently determining the liquid level. Alternately, the baseline characteristic may be separately remeasured and reset. This process may be repeated throughout the fill operation until the liquid is determined to be at or above the probe, at which time the fill operation may be stopped.

These and other aspects of the invention will be apparent from the following description and claims.

BRIEF DESCRIPTION OF DRAWINGS

Aspects of the invention are described below with reference to illustrative embodiments, wherein like elements reference like numerals, and wherein.

DETAILED DESCRIPTION

Aspects of the invention may be practiced using any suitable arrangement for the probe sensor and/or any associated beverage forming system. Several different embodiments are described herein for purposes of illustration. However, these illustrative embodiments should not be used to narrowly interpret the scope of the invention. For example, embodiments are described below in which a single probe sensor is used to determine a liquid level in a tank. However, two or more probes may be used at multiple levels so that the system is capable of determining two or more liquid levels in the tank. In addition, various aspects of the invention are described herein, and these various aspects may be used in any suitable combination with each other, or alone.

In one aspect of the invention, a liquid level sensing arrangement actually measures a baseline characteristic of a level sensing probe circuit, and uses the measured baseline characteristic to determine liquid level. This is in contrast to systems having a probe arrangement that detects a liquid level when a resistance of the probe circuit drops below a predetermined, absolute threshold. As discussed above, such systems can be inaccurate when detecting liquids having a high resistance and/or when there is scale or other deposits present on the tank, probe or other portions of the probe circuit. In one embodiment, the level sensing arrangement can update the baseline characteristic of the probe circuit two or more times during a single fill operation of the tank, thereby obtaining a more accurate baseline to compare to later measurements and determine a liquid level.

In one aspect of the invention, the baseline characteristic may be a resistance or voltage of an electrical probe circuit, but other characteristics may be used, such as a capacitance, a value that represents a capacitance of the circuit (such as a circuit charge time), an impedance, an optical transmittance or other property (e.g., if the level sensing arrangement uses an optical detector to detect the liquid level), a pressure, and so on. Thus, aspects of the invention may be used with any suitable measuring/detecting technique, not just resistance/voltage-based approaches.

Figure 1:
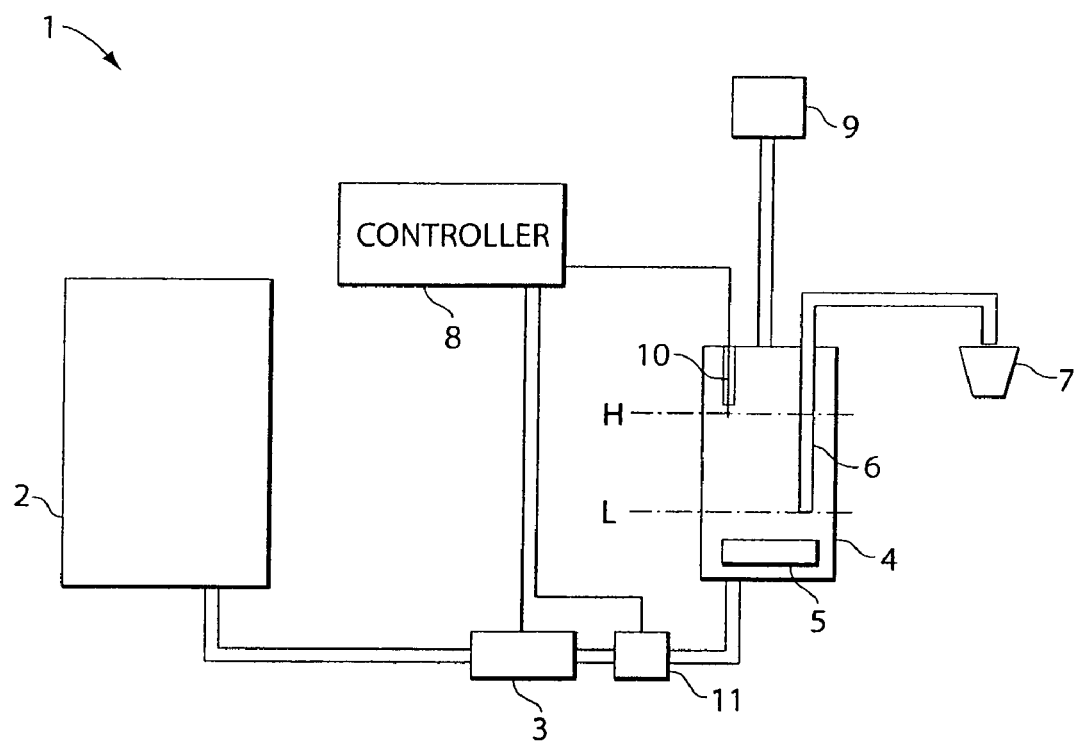
FIG. 1 shows a schematic view of a level sensing system in accordance with the invention that is incorporated into a beverage forming system.

FIG. 1 shows a schematic block diagram of a beverage forming system 1 incorporating a level sensing arrangement in accordance with aspects of the invention. As discussed above, aspects of the invention may be used with any type of system, not just beverage forming systems. In this illustrative embodiment, the beverage forming system 1 includes a storage tank 2 that is adapted to store a quantity of water or other liquid used in forming a beverage. Water from the storage tank 2 may be supplied by a pump 3 to a metering tank 4. Water in the metering tank 4 may be heated by a heater 5, such as an electrical resistance heating element. Heated water may be discharged from the metering tank by an air pump 9 that pressurizes the metering tank 4 and forces water from the tank 4 into a conduit 6 for flow to a brew chamber 7. The brew chamber 7 may operate in any suitable way to form a beverage from the water supplied by the conduit 6, such as contacting the water with a beverage medium (e.g., roasted and ground coffee) to form a beverage (e.g., a coffee beverage). The brew chamber 7 may be arranged to use a disposable beverage cartridge, such as a sealed container that includes the beverage medium and a filter element such that heated water may be injected into the container to infuse the beverage medium, and filtered beverage may be removed from the cartridge. Those of skill in the art will appreciate that other beverages may be formed, such as tea or other brewed or non-brewed beverages that include water soluable materials.

Operation of the water pump 3, heater 5, air pump 9 and other portions of the system 1 may be controlled by a controller 8. The controller 8 may include one or more general purpose computing devices, a memory, suitable software or other operating instructions, user input/output devices, communication busses or other links, sensors, switches, relays, triacs, and/or other components necessary to perform desired input/output or other functions. The level of the water in the tank 4 may be detected by the controller 8 via a probe 10, which may include a conductive member that is electrically insulated from the tank and positioned to contact liquid in the tank when the liquid is present at or above a particular level. For example, when liquid is discharged from the tank 4 by the air pump 9, the liquid level will be at a low level L that is approximately equal to a level at the bottom of the conduit 6 in the tank 4. (Completion of the discharge of liquid from the tank 4 may be detected by the controller 8 detecting a drop in pressure in the tank 4 via a pressure sensor 11. That is, when water is being forced from the tank 4 into the conduit 6 the pressure may be relatively high as compared to pressure in the tank 4 when the liquid is fully discharged and air is being forced from the tank 4 into the conduit 6. The pressure sensor 11, which may be placed at any suitable location, such as in the water supply line, in the tank 4, etc., may detect this drop in pressure signifying completion of the liquid discharge.) Thereafter, the controller 8 may control the water pump 3 to begin filling of the tank 4 to ready the system 1 for formation of another beverage.

During filling of the tank 4, the controller 8 may monitor a characteristic of a circuit that includes the probe 10 to detect a change in the characteristic that indicates that the liquid level in the tank 4 has reached the probe 10, i.e., the level is at or above a high level H. For example, the controller 8 may monitor the probe circuit for a change in resistance and/or voltage that indicates that the liquid has contacted the probe 10. (In some embodiments, water is generally low in resistance, and thus a normally "open" circuit between the probe 10 and the tank walls will have a high resistance until water completes a circuit between the probe 10 and the tank 4, dropping the resistance of the circuit. Even when RODI water is used in the system, a detectable change in resistance/voltage/capacitance may be detected in accordance with aspects of the invention.)

In one embodiment, the controller 8 may apply a constant DC signal to the probe circuit and monitor the circuit for changes in voltage, e.g., every 8.3 milliseconds or so. The DC signal may be applied during a time when a low pressure is detected at the end of a tank discharge operation until the fill operation of the tank is stopped. Thereafter, the DC signal may be shut off, and restarted at the end of a next discharge of the tank. It should be understood that other signals may be applied to the probe circuit as desired, such as an AC signal, which may help to reduce scale and/or other deposits on the probe in some applications, especially if the probe remains powered for long periods. In addition, the controller 8 may have a "blind" period for the probe circuit such that the controller 8 does not use output from the probe circuit during a time period that starts when a tank fill operation is started. Thus, any splashing of liquid in the tank that may wet the probe during initial fill (and possibly cause a false level indication) may be ignored. Also, any suitable filtering of the signal provided from the probe circuit may be used, e.g., a filter that requires that a difference between the baseline characteristic and the measured characteristic remains above (or below) a threshold for a specified period of time, such as ⅓ sec. for detection of the liquid level. This type of filtering may help avoid detecting "false positives."

In accordance with an aspect of the invention, the controller 8 may measure the resistance or some other characteristic of the probe circuit when the probe is in a known condition, e.g., when the probe is "dry" or known to be out of contact with the liquid in the tank 4. In one embodiment, the controller 8 may know that the probe 10 is out of contact with the liquid in the tank 4 when the pressure sensor 11 detects the end of a discharge of liquid from the tank. At this time or thereafter, the controller 8 may measure the characteristic of the probe circuit and use the measured characteristic as a baseline characteristic for the probe circuit. This baseline may be used for the next fill operation and/or for several subsequent fill cycles. Alternately, the baseline may be updated for each fill operation. The baseline characteristic may be compared to other characteristic measurements while the tank is being filled, and based on the comparison, the controller 8 may determine whether or not the liquid is at or above the probe level, e.g., at or above the high level H. For example, a baseline resistance measured by the controller 8 immediately before a fill operation is begun may be compared to subsequent resistance measurements of the probe circuit as filling of the tank is performed by the water pump 3.

In one embodiment, a difference between the baseline characteristic and a measured characteristic may be determined, and based on the difference, the controller may determine whether the liquid is at or above the probe level. For example, the controller may detect a particular baseline voltage for the probe circuit, then later detect another voltage for the probe circuit. A difference between the baseline voltage and the later measured voltage may be compared to a threshold, and if the difference exceeds the threshold, the controller may determine that the liquid level is at the probe. If not, the controller may later measure the voltage of the circuit again, compare the voltage to the baseline, determine the level of the liquid, and so on until the liquid level is determined to be at the probe. By using a difference between the baseline and later measured characteristic, relatively small changes in the characteristic may be detected, such as small changes in probe circuit resistance caused by RODI water contacting the probe. In one embodiment, the controller 8 may detect the presence of water at the probe 10 when the difference between a baseline voltage and a measured voltage is about 362 millivolts or more.

In one embodiment, the baseline characteristic may be updated or refreshed two or more times during a fill operation for the tank. For example, if the controller measures a baseline characteristic, then later measures the probe circuit characteristic and determines that the liquid level is below the probe, the controller may assign the value of the later measured characteristic as the baseline characteristic. The controller may repeat this process as suitable until the liquid level is determined to be at the probe. In one embodiment, only values that are higher (or lower) than the baseline characteristic may be used to refresh or update the baseline characteristic. This type of approach may be useful when the tank, probe or other portions of the probe circuit have scale or other deposits that affect the resistance or other characteristic of the circuit. As discussed above, some such deposits may cause the resistance of the probe circuit to change from one fill cycle to the next and/or during a single fill operation. By updating or refreshing the baseline characteristic during a fill operation, the controller may take changes in the probe circuit caused by scale, deposits or other factors into account (particularly those that affect the probe circuit characteristic during the fill operation) and be able to accurately detect the presence of the liquid at the probe. Such an approach may increase the signal to noise ratio, and thereby increase the accuracy of the sensing operation. Another feature that may provide additional accuracy in detection may be to measure the circuit characteristic for determining level change during a relatively short time span, e.g., to help avoid variations that may occur over larger time spans.

In another embodiment, the system may be capable of determining the type of water or other liquid used in the system, and adjust the system operation accordingly. For example, the system may be able to determine whether RODI or standard tap water is being used in the system, and use a suitable threshold when determining a difference between the baseline characteristic and the measured characteristic. Thus, the threshold may be a variable one, that is adjusted based on the type of water or other liquid used.

Figure 2:
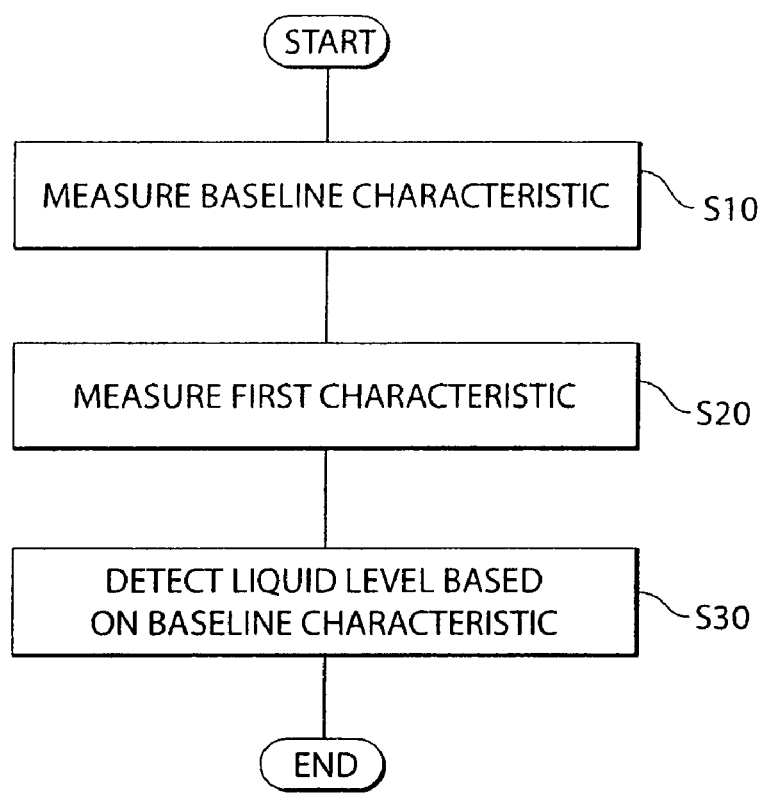
FIG. 2 shows steps in a method for determining a liquid level in a tank in accordance with the invention.

FIG. 2 shows a flow chart of steps in a method for determining a liquid level in a tank or other reservoir. In step S10, a baseline characteristic for a probe circuit may be measured. In arrangements using a conductive probe, a resistance, voltage, capacitance or other feature of an electrical circuit including the conductive probe may be measured. In other arrangements, another suitable characteristic used to detect the liquid level may be measured, such as an optical impedance or optical signal amplitude, a pressure, temperature, etc. The baseline characteristic may be measured when the probe is in a known state, such as when the probe is known to be out of contact with the liquid immediately or shortly after an amount of liquid has been discharged from a tank.

In step S20, a first characteristic of the probe circuit may be measured after the baseline characteristic has been measured. For example, the first characteristic may be measured shortly after the baseline characteristic is measured after the start of a fill operation of a tank. In another embodiment, the first characteristic may be measured many fill/discharge cycles after the baseline characteristic has been measured, e.g., when the baseline characteristic is used for multiple fill operations for the tank. The first characteristic may be measured in the same way as the baseline characteristic. For example, if the probe circuit uses an optical detector to detect the presence/absence of a liquid between a light emitter and a detector, the emitter may be controlled to emit light at the same intensity, frequency, duration, etc. as when measuring the baseline characteristic.

In step S30, a determination of the liquid level may be made based on the baseline characteristic. For example, a determination may be made whether the liquid is below the probe, or at or above the probe based on the baseline characteristic. In one embodiment, the first characteristic may be compared to the baseline characteristic, and based on the comparison, the liquid level determination may be made. In this case, the determination of the liquid level will correspond to a time at or about the time that the first characteristic was measured. A difference between the baseline characteristic and the first characteristic may be determined, and the liquid level determined based on the difference value. For example, if the baseline characteristic is a resistance, if the difference in resistance between the baseline characteristic and the first characteristic exceeds a threshold, a determination may be made that the liquid is at or above the probe. By setting the threshold to a suitable value, an accurate determination of the liquid level may be made, even when the sensing arrangement is used with relatively high resistance liquids, such as RODI water.

In one embodiment, if the comparison of the first characteristic and the baseline characteristic does not determine that the liquid is at or above the probe, a value of the first characteristic may be assigned to the baseline characteristic. Thus, the system may update the baseline characteristic each time the probe circuit characteristic is measured, and in some cases may do so multiple times during a fill operation of a tank or other reservoir. As discussed above, updating the baseline characteristic may be useful in some applications, e.g., where the probe circuit resistance changes during the fill operation due to drying of scale or other deposits that affect the probe circuit. Thereafter, a second characteristic may be measured after the first characteristic was measured, and the second characteristic may be compared to the baseline characteristic to make a liquid level determination for a time that corresponds to at or about the time that the second characteristic was measured.

While the invention has been described in conjunction with specific embodiments thereof, it is evident that many alternatives, modifications, and variations will be apparent to those skilled in the art. Accordingly, embodiments of the invention as set forth herein are intended to be illustrative, not limiting. Various changes may be made without departing from the spirit and scope of the invention.

What is claimed is:

1. A method for determining a level of a liquid in a tank, comprising:
   providing a tank in which a liquid level is variable;
   measuring a baseline characteristic of a probe circuit including a probe associated with the tank while the probe is out of contact with the liquid in the tank;
   starting a filling of the tank from a level at which the probe is out of contact with the liquid;
   measuring a first characteristic of the probe circuit after measuring the baseline characteristic and during filling of the tank;
   determining the liquid level in the tank corresponding to about a time that the first characteristic is measured based on the first characteristic and the baseline characteristic;
   wherein if the step of determining determines that the liquid is out of contact with the probe, the method further comprises:
      assigning an updated value as the baseline characteristic based on a characteristic measured during filling of the tank;
      measuring a second characteristic of the probe circuit after measuring the first characteristic and during filling of the tank; and
      determining the liquid level in the tank corresponding to about a time that the second characteristic is measured based on the second characteristic and the updated baseline characteristic.

2. The method of claim 1, wherein the step of determining the liquid level in the tank corresponding to about a time that the first characteristic is measured comprises comparing the first characteristic to the baseline characteristic.

3. The method of claim 1, wherein the step of determining the liquid level in the tank corresponding to about a time that the first characteristic is measured comprises determining whether the liquid level is at or above the probe, or is below the probe.

4. The method of claim 1, wherein the step of determining the liquid level in the tank corresponding to about a time that the first characteristic is measured comprises determining a difference between the baseline characteristic and the first characteristic.

5. The method of claim 4, wherein the liquid level is determined to be at or above the probe when the difference between the baseline characteristic and the first characteristic exceeds a threshold.

6. The method of claim 1,
   wherein assigning an updated value as the baseline characteristic comprises assigning a value of the first characteristic as the baseline characteristic.

7. The method of claim 6, wherein the value of the first characteristic is assigned as the baseline characteristic when the liquid level is determined to be below the probe at about the time that the first characteristic is measured.

8. The method of claim 1, wherein the baseline characteristic represents a resistance, a voltage, or a capacitance present in the probe circuit.

9. The method of claim 1, wherein the probe includes a conductive portion and the probe circuit includes at least a portion of the tank.

10. The method of claim 1, further comprising:
    dispensing liquid from the tank to a chamber so as to contact the liquid with a beverage medium and form a beverage.

11. The method of claim 10, wherein the liquid is water and the beverage is a coffee, tea or other beverage including a liquid soluble material.

12. A liquid level determining system comprising:
    a probe circuit including a conductive probe constructed and arranged to contact a liquid in a tank in which a liquid level is variable; and
    a controller adapted to measure a baseline characteristic of the probe circuit while the conductive probe is out of contact with the liquid in the tank, measure a first characteristic of the probe circuit after measuring the baseline characteristic and during filling of the tank, and determine the liquid level in the tank corresponding to about a time that the first characteristic is measured based on the first characteristic and the baseline characteristic;
    wherein the controller is adapted to assign an undated value as the baseline characteristic based on a characteristic measured during filling of the tank if the liquid is determined to be out of contact with the conductive probe at about the time that the first characteristic is measured; and
    wherein the controller is adapted to measure a second characteristic of the probe circuit after measuring the first characteristic and during filling of the tank, and adapted to determine a liquid level corresponding to about a time that the second characteristic is measured based on the second characteristic and the updated baseline characteristic.

13. The system of claim 12, wherein the controller is adapted to compare the first characteristic to the baseline characteristic to determine the liquid level in the tank corresponding to about the time that the first characteristic is measured.

14. The system of claim 12, wherein the controller is adapted to determine whether the liquid level in the tank corresponding to about the time that the first characteristic is measured is at or above the conductive probe, or is below the conductive probe.

15. The system of claim 12, wherein the controller is adapted to determine a difference between the baseline characteristic and the first characteristic, and to determine the liquid level in the tank corresponding to about the time that the first characteristic is measured based on the difference.

16. The system of claim 15, wherein the controller is adapted to determine that the liquid level in the tank corresponding to about the time that the first characteristic is measured is at or above the conductive probe if the difference between the baseline characteristic and the first characteristic exceeds a threshold.

17. The system of claim 12, wherein the controller is adapted to assign a value of the first characteristic as the baseline characteristic during filling of the tank if the liquid is determined to be out of contact with the conductive probe at about the time that the first characteristic is measured.

18. The system of claim 17, wherein the value of the first characteristic is assigned as the baseline characteristic when the liquid level is determined to be below the conductive probe at about the time that the first characteristic is measured.

19. The system of claim 12, wherein the controller is adapted to control a tank fill system to start filling the tank from a level at which the conductive probe is out of contact with the liquid, and to determine the liquid level during filling of the tank.

20. The system of claim 12, wherein the baseline characteristic represents a value that varies with variations in a resistance, a voltage, or a capacitance present in the probe circuit.

21. The system of claim 12, wherein the probe circuit includes at least a portion of the tank.

22. The system of claim 12, wherein the controller is adapted to repeatedly measure the baseline characteristic during filling of the tank.

23. The system of claim 12, further comprising:
a beverage forming system adapted to form a beverage using liquid from the tank that is supplied to a chamber.

24. The system of claim 23, wherein the liquid is water and the beverage is a coffee, tea or other beverage including a liquid soluble material.

25. The system of claim 23, wherein the beverage forming system includes a brew chamber adapted to receive a disposable cartridge including a beverage medium, and wherein the beverage is formed by contacting the beverage medium with the liquid.

26. The system of claim 25, wherein the beverage forming system includes a heater that heats the liquid that contacts the beverage medium.

27. The system of claim 23, wherein the beverage forming system includes a water storage tank, and a metering tank in which water from the tank is heated and from which water is provided to the chamber.

28. A method for determining a level of a liquid in a tank, comprising:
providing a tank in which a liquid level is variable;
measuring a baseline characteristic of a probe circuit including a conductive probe associated with the tank while the conductive probe is out of contact with the liquid in the tank;
starting a filling of the tank from a level at which the probe is out of contact with the liquid;
measuring a first characteristic of the probe circuit after measuring the baseline characteristic and during filling of the tank;
determining the liquid level in the tank corresponding to about a time that the first characteristic is measured based on the first characteristic and the baseline characteristic;
wherein if the step of determining determines that the liquid is out of contact with the conductive probe, the method further comprises:
assigning an undated value as the baseline characteristic based on a characteristic measured during filling of the tank;
measuring a second characteristic of the probe circuit after measuring the first characteristic and during filling of the tank; and
determining a liquid level corresponding to about a time that the second characteristic is measured based on the second characteristic and the baseline characteristic.

* * * * *

UNITED STATES PATENT AND TRADEMARK OFFICE
CERTIFICATE OF CORRECTION

PATENT NO. : 7,360,418 B2  
APPLICATION NO. : 11/168884  
DATED : April 22, 2008  
INVENTOR(S) : Robert Pelovitz Page 1 of 1

It is certified that error appears in the above-identified patent and that said Letters Patent is hereby corrected as shown below:

At column 8, claim 12, line 53, "undated" should read -- updated --

At column 10, claim 28, line 36, "undated" should read -- updated --

Signed and Sealed this

Twenty-ninth Day of July, 2008

JON W. DUDAS  
*Director of the United States Patent and Trademark Office*